(12) United States Patent
Bestler

(10) Patent No.: US 7,849,211 B2
(45) Date of Patent: Dec. 7, 2010

(54) METHOD AND SYSTEM FOR RELIABLE MULTICAST DATAGRAMS AND BARRIERS

(75) Inventor: Caitlin Bestler, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 697 days.

(21) Appl. No.: 11/433,287

(22) Filed: May 12, 2006

(65) Prior Publication Data

US 2007/0266174 A1    Nov. 15, 2007

(51) Int. Cl.
*G06F 15/173* (2006.01)
*G06F 15/177* (2006.01)

(52) U.S. Cl. .................. 709/238; 709/223; 709/226; 709/227

(58) Field of Classification Search ............ 709/223, 709/226, 227, 238
See application file for complete search history.

(56) References Cited

U.S. PATENT DOCUMENTS

| | | | | |
|---|---|---|---|---|
| 5,511,168 | A * | 4/1996 | Perlman et al. ............ | 709/243 |
| 6,658,463 | B1 * | 12/2003 | Dillon et al. ............... | 709/219 |
| 6,782,527 | B1 * | 8/2004 | Kouznetsov et al. ....... | 717/103 |
| 7,225,275 | B2 * | 5/2007 | Medin ........................ | 709/249 |
| 7,240,105 | B2 * | 7/2007 | Satran et al. ............... | 709/222 |
| 7,293,009 | B2 * | 11/2007 | Jacobs et al. ............... | 707/1 |
| 7,346,699 | B1 * | 3/2008 | Krause et al. .............. | 709/232 |
| 7,574,526 | B2 * | 8/2009 | Kashyap et al. ............ | 709/242 |
| 2002/0035681 | A1 * | 3/2002 | Maturana et al. .......... | 713/151 |
| 2002/0065941 | A1 * | 5/2002 | Kaan et al. ................. | 709/249 |
| 2003/0135464 | A1 * | 7/2003 | Mourad et al. ............. | 705/50 |
| 2005/0132291 | A1 * | 6/2005 | Wagner et al. ............. | 715/716 |
| 2006/0085349 | A1 * | 4/2006 | Hug ............................ | 705/57 |
| 2007/0019600 | A1 * | 1/2007 | Zhang ........................ | 370/338 |
| 2007/0105628 | A1 * | 5/2007 | Arbogast et al. ........... | 463/42 |
| 2007/0204275 | A1 * | 8/2007 | Alshab et al. .............. | 719/313 |
| 2010/0166058 | A1 * | 7/2010 | Perlman et al. ............ | 375/240.02 |
| 2010/0166062 | A1 * | 7/2010 | Perlman et al. ............ | 375/240.05 |
| 2010/0167816 | A1 * | 7/2010 | Perlman et al. ............ | 463/30 |

FOREIGN PATENT DOCUMENTS

| | | |
|---|---|---|
| GB | 2288096 B1 | 10/1995 |
| WO | 9925096 B1 | 5/1999 |
| WO | 0031929 B1 | 6/2000 |

* cited by examiner

*Primary Examiner*—Ario Etienne
*Assistant Examiner*—Sargon N Nano
(74) *Attorney, Agent, or Firm*—McAndrews, Held & Malloy, Ltd.

(57) ABSTRACT

Aspects of a method and system for reliable multicast datagrams and barriers are presented. Various aspects of the system may include a hub that enables storage of data received from a data source in a multicast group. The data source may be associated with a computer in a distributed cluster computing system. The hub may enable multicast of the received data to a plurality of data destinations in the multicast group. The data destinations may be associated with a corresponding plurality of computers in the distributed cluster computing system. The hub may enable reception of an acknowledgement from each of the plurality of data destinations. The hub may enable an acknowledgement to be sent to the data source.

30 Claims, 11 Drawing Sheets

METHOD AND SYSTEM FOR RELIABLE MULTICAST DATAGRAMS AND BARRIERS

CROSS-REFERENCE TO RELATED APPLICATIONS/INCORPORATION BY REFERENCE

This application makes reference to:
U.S. application Ser. No. 11/269,062 filed on Nov. 8, 2005;
U.S. application Ser. No. 11/269,005 filed on Nov. 8, 2005; and
U.S. application Ser. No. 11/269,422 filed on Nov. 8, 2005.

Each of the above stated applications is hereby incorporated herein by reference in its entirety.

FIELD OF THE INVENTION

Certain embodiments of the invention relate to data communications. More specifically, certain embodiments of the invention relate to a method and system for reliable multicast datagrams and barriers.

BACKGROUND OF THE INVENTION

In conventional computing, a single computer system is often utilized to perform operations on data. The operations may be performed by a single processor, or central processing unit (CPU) within the computer. The operations performed on the data may include numerical calculations, or database access, for example. The CPU may perform the operations under the control of a stored program containing executable code. The code may include a series of instructions that may be executed by the CPU that cause the computer to perform specified operations on the data. The capability of a computer in performing operations may variously be measured in units of millions of instructions per second (MIPS), or millions of operations per second (MOPS).

Historically, increases in computer performance have depended on improvements in integrated circuit technology, often referred to as "Moore's law". Moore's law postulates that the speed of integrated circuit devices may increase at a predictable, and approximately constant, rate over time. However, technology limitations may begin to limit the ability to maintain predictable speed improvements in integrated circuit devices.

Another approach to increasing computer performance implements changes in computer architecture. For example, the introduction of parallel processing may be utilized. In a parallel processing approach, computer systems may utilize a plurality of CPUs within a computer system that may work together to perform operations on data. Parallel processing computers may offer computing performance that may increase as the number of parallel processing CPUs in increased. The size and expense of parallel processing computer systems result in special purpose computer systems. This may limit the range of applications in which the systems may be feasibly or economically utilized.

An alternative to large parallel processing computer systems is cluster computing. In cluster computing, a plurality of smaller computer, connected via a network, may work together to perform operations on data. Cluster computing systems may be implemented, for example, utilizing relatively low cost, general purpose, personal computers or servers. In a cluster computing environment, computers in the cluster may exchange information across a network similar to the way that parallel processing CPUs exchange information across an internal bus. Cluster computing systems may also scale to include networked supercomputers. The collaborative arrangement of computers working cooperatively to perform operations on data may be referred to as high performance computing (HPC).

Cluster computing offers the promise of systems with greatly increased computing performance relative to single processor computers by enabling a plurality of processors distributed across a network to work cooperatively to solve computationally intensive computing problems.

In many distributed computing systems, a computer may communicate information to each of the other computers in the computing cluster. One method for communicating the information may utilize multicasting. Some conventional distributed cluster computing systems implement multicasting in application gateway servers. The computer, which is the originator of the multicast, or the source computer, may send information to the application gateway server. The set of computers, which are to receive the data, may be referred to as a multicast group. The application gateway server may then store a copy of the received information and subsequently communicate the information to each of the computers in a multicast group. The application gateway server may communicate the information to the multicast group via a reliable communication protocol, for example, transmission control protocol (TCP). Upon receiving indications that each of the computers in the multicast group has received the information, the application gateway server may no longer be required to store the information. Consequently, the information may be released from storage at the application gateway server. In large cluster computing systems, the quantity of storage required at the application gateway server may impose a burden that may reduce the performance and/or cost effectiveness of the cluster computing system. This burden is imposed even when message storage is limited to non-persistent media, such as system memory.

In addition to distributing information among computers in a computing cluster, the processing tasks performed by each of the computers may be coordinated. The task of coordinating the tasks performed by each of the computers in a computing cluster is referred to as synchronization. Synchronization involves dividing a computing task into stages, referred to as epochs. The computers in the computing cluster may each perform different tasks in a portion of their respective epochs. The computers in the computing cluster may operate on different portions of aggregated data in a given epoch. In some cases, however, the ability of a computer to begin a subsequent epoch is dependent upon another computer in the cluster having completed a prerequisite epoch. The computer may rely upon the results of data processed during the prerequisite epoch when performing further processing in the subsequent epoch.

In some conventional distributed cluster computing systems, the problem of synchronization may be addressed by utilizing semaphores, tokens, or other locking techniques that enables a computer to perform an operation when a precondition has been satisfied. For example, the completion of a prerequisite epoch is an example of a precondition that may be required to be satisfied.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for reliable multicast datagrams and barriers, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
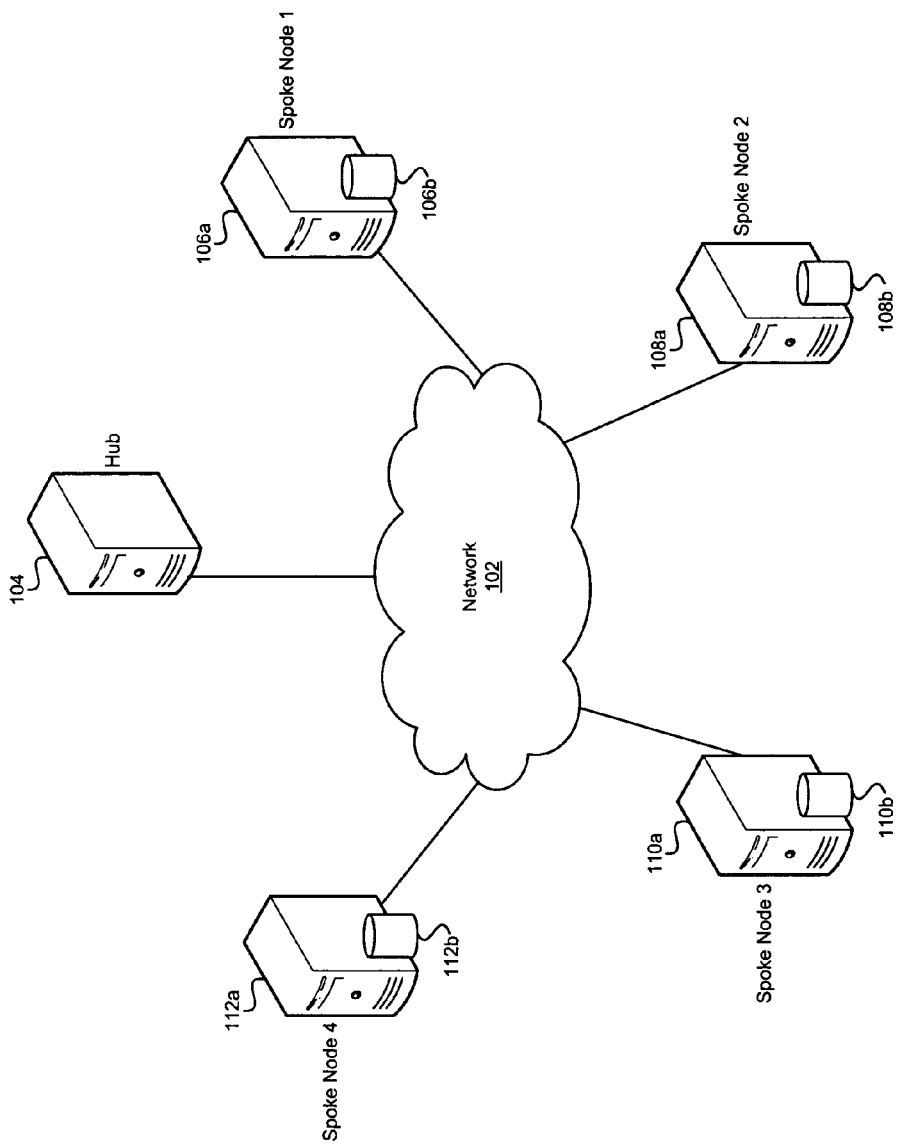
FIG. 1 illustrates an exemplary distributed cluster computing system environment for reliable multicast datagrams and barriers, which may be utilized in connection with an embodiment of the invention.

Certain embodiments of the invention may be found in a method and system for reliable multicast datagrams and barriers. Various aspects of the system may comprise a hub that enables storage of data received from a data source in a multicast group. The data source may be associated with a computer in a distributed cluster computing system. The hub may enable multicast of the received data to a plurality of data destinations in the multicast group. The data destinations may be associated with a corresponding plurality of computers in the distributed cluster computing system. The hub may enable reception of an acknowledgement from each of the plurality of data destinations. The hub may enable sending of an acknowledgement to the data source.

In various embodiments of the invention, the hub may be utilized to enable multicast distribution of data from the data source, to a plurality of data destinations in the multicast group. An exemplary configuration in which the invention may be practiced may comprise a star configuration in which the hub may be communicatively coupled to each data destination within the multicast group. A data source may send multicast data to the hub. The hub may subsequently communicate the data to each of the data destinations in the multicast group.

The hub may store the received data until the data has been multicast to each of the data destinations in the multicast group. The hub may subsequently release resources allocated to the storage of the received data. The data source, however, may continue to allocate resources for storage of the data sent to the hub. The hub may continue to allocate resources for storage of state information associated with the multicast of the data to each of the data destinations. The quantity of resources utilized at the hub for storage of state information may be less than the quantity of resources utilized for storage of the received data.

Obligating the hub to store received data may limit the scalability of the hub. In various embodiments of the invention, the hub may instead store data required to determine when it may send an acknowledgement to the data source. Until the acknowledgement is sent by the hub, the data source may retain a copy of the data. Storage of the data at the hub may comprise an optional enhancement.

The hub may receive an acknowledgement from one or more data destinations in the multicast group in response to the multicast distribution of data. The hub may store information to identify each of the data destinations that has sent an acknowledgement. In response to receiving an acknowledgement from each of the data destinations in the multicast group, the hub may send an acknowledgement to the data source. The acknowledgement may refer to the multicast data previously sent by the data source. The acknowledgement may inform the data source that the multicast of data to the multicast group has been successfully completed. The data source may subsequently release resources that were allocated to storage of the data sent to the hub.

In one aspect of the invention, the hub may function as a switching device in a communications network. The hub may be utilized to facilitate the transfer of data between nodes in a distributed computing cluster without being required to store the data until the transfer has been completed.

In some conventional systems, the function of the hub may be performed by an application gateway device. When a data source sends data to an application gateway to be multicast to a multicast group, the application gateway may store the received data, multicast the received data to the plurality of data destinations in the multicast group, and continue to allocate resources to enable storage of the received data. The application gateway may subsequently receive acknowledgements from data destinations in the multicast group. After receiving an acknowledgement from each of the data destinations, the application gateway may release resources allocated to the storing of data at the application gateway. When being utilized as an application gateway, the hub may relieve the data source from the task of tracking delivery of the data to the destinations in the multicast group. This may require that the hub store the data until each of the destinations in the multicast group has acknowledged receipt of the data.

In various embodiments of the invention, in which the hub may function as a switching device, the data source may be required to store the data, while the hub may perform the task of collecting and correlating acknowledgements from each of the data destinations.

Various embodiments of the invention may also be utilized to enable synchronization in distributed cluster computing systems, and/or in multicast groups. The method may comprise fencing, or fenceposting. A fencepost may represent a status marker, which indicates a processing stage that has been completed by a computing node, or node, within a cluster computing environment. Aspects of the method may comprise a node that sends a progress message to a hub upon completion of tasks associated with an epoch. The node may be a station member in a multicast group or distributed cluster computing system. The progress message may comprise a stage number indication. The stage number indication may indicate completion of the epoch and identification of an ordinal epoch, among a plurality of epochs that has been completed by the node. Associated with each ordinal epoch may be a corresponding stage number. A value associated with the stage number indication may be compared to values stored in a table fencepost markers stored at the hub. The table of fencepost markers may comprise one or more values associated with other stage number indications sent to the hub by other nodes. Based on the comparison, the hub may send a progress update message in response to the received progress message to each node or station member in the multicast group. The progress update message may indicate a minimum stage number that may correspond to a minimum number of epochs for which processing has been completed by each of the nodes in the multicast group.

Each of the nodes receiving the progress update message may utilize the information contained within the progress update message to determine whether a precondition has been satisfied that may enable the node to begin processing tasks in connection with a subsequent epoch. In this aspect, the information contained within the progress update message may be utilized to define a barrier. The barrier may comprise a precondition that may be satisfied before a node may begin processing tasks related to a subsequent epoch. The barrier may be satisfied by completion of a prerequisite epoch at one or more of the nodes within a distributed cluster computing system. The preconditions associated with a barrier may be defined for each of one or more nodes independently from other nodes.

FIG. 1 illustrates an exemplary distributed cluster computing system environment for reliable multicast datagrams and barriers, which may be utilized in connection with an embodiment of the invention. Referring to FIG. 1, there is shown a network 102, a hub 104, a plurality of spoke nodes 106a, 108a, 110a, and 112a, and a corresponding plurality of database applications 106b, 108b, 110b, and 112b. The network 102 may comprise a plurality of communications media and/or communications equipment that enables a spoke node 106a to communicate with another spoke node 108a, and/or with the hub 104. In various exemplary embodiments of the invention, the functionality associated with the hub node 104, and/or a spoke node 106a may be implemented in, but not limited to, a computer system. The functionality of the hub node 104 may be located in a separate computer system from a spoke node 106a, or collated with one or more spoke nodes in a computer system, for example.

The hub 104, and spoke nodes 106a, 108a, 110a, and 112a may be coupled to the network 102. One or more of the spoke nodes 106a, 108a, 110a, and 112a may execute a corresponding database application 106b, 108b, 110b, and 112b, respectively, for example. In general, a plurality of software processes, for example a database application, may be executing concurrently at a spoke node and/or hub.

In various embodiments of the invention, a multicast group may comprise the spoke nodes 106a, 108a, 110a, and 112a. In a star configuration, for example, the hub 104 may enable a spoke node, for example 106a, in the multicast group to multicast data to the multicast group comprising spoke nodes 106a, 108a, 110a, and 112a, via the hub 104. A data base application, for example 106b, may multicast data to a plurality of database applications 106b, 108b, 110b, and 112b by sending the data to the hub 104, via the network 102. The spoke node 106a may send the data to the hub 104. The hub 104 may subsequently multicast the data to the plurality of spoke nodes 106a, 108a, 110a, and 112a via the network 102.

The hub 104, and spoke nodes 106a, 108a, 110a, and 112a may utilize a plurality of protocols when sending, receiving, and/or multicasting data via the network 102. Many of these protocols may be defined by standards documents from the Internet Engineering Task Force (IETF). These standards documents may include request for comments (RFC) documents. An exemplary communications protocol that may be utilized to establish a network connection is the Transmission Control Protocol (TCP). RFC 793 discloses communication via TCP and is hereby incorporated herein by reference. An exemplary protocol that may be utilized to route information transported in a network connection across a network is the Internet Protocol (IP). RFC 791 discloses communication via IP and is hereby incorporated herein by reference. An exemplary medium for transporting and routing information across a network is Ethernet, which is defined, for wired and wireless media respectively, by Institute of Electrical and Electronics Engineers (IEEE) standards 802.3 and 802.11, which are hereby incorporated herein by reference.

TCP may be referred to as a reliable communications protocol. A data source, for example the spoke node 106a, that sends data via TCP to a data destination, for example the hub 104, may expect to receive an acknowledgement from the data destination in response to the sent data. If the data source does not receive an acknowledgement after a given time duration from the time instant at which the data was sent, the data source may resend the data at a subsequent time instant. The requirement for reliable communications may further require that the data source store the sent data until receiving an acknowledgement from the data destination.

Various embodiments of the invention may utilize any of a plurality of reliable communications protocols for the point-to-point communication between a spoke node and the hub. An exemplary reliable communications protocol may be TCP. The reliable communications protocols may not be limited to TCP by may also comprise MST-MPA and SCTP, for example.

The hub 104 may subsequently transmit the data to each of the spoke nodes in the multicast group, 106a, 108a, 110a, and 112a. The hub 104 may utilize a reliable protocol such as TCP during the transmission of the data, for example. The hub may subsequently release at least a portion of the resources allocated to the storage of the received data. The hub may continue to store identification and/or state information related to the transmission of the data to each of the spoke nodes. The hub 104 may subsequently receive acknowledgements from spoke nodes that indicate that the corresponding spoke node has received the multicast data. The hub node 104 may update identification information contained in each acknowledgement to update the corresponding state information. When the hub node 104 receives acknowledgements from each of the spoke nodes, the hub 104 may send an acknowledgement to the spoke node 106a, which originally sent the data to be multicast. In response to receipt of the acknowledgement message, the spoke node 106a may release resources allocated to the storing of the data sent to the hub 104 to be multicast.

Figure 2:
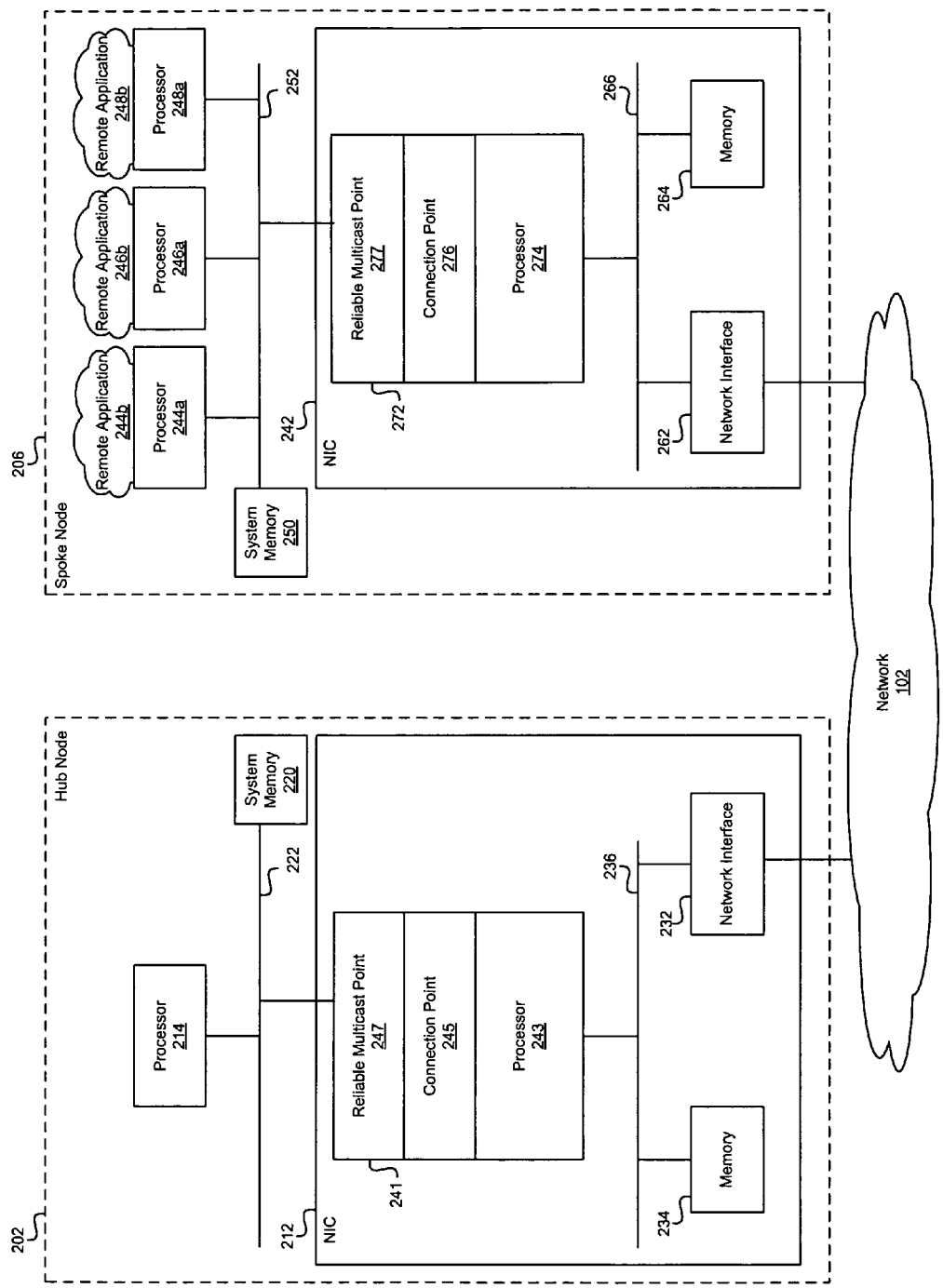
FIG. 2 is a block diagram of an exemplary system for reliable multicast, in accordance with an embodiment of the invention.

FIG. 2 is a block diagram of an exemplary system for reliable multicast, in accordance with an embodiment of the invention. Referring to FIG. 2, there is shown a network 102, and a hub node 202, and a spoke node 206. The hub node 202 may comprise a network interface card (NIC) 212, a processor 214, a system memory 220, and a bus 222. The NIC 212 may comprise a TCP offload engine (TOE) 241, a memory 234, a network interface 232, and a bus 236. The TOE 241 may comprise a processor 243, a connection point 245, and a reliable multicast point 247. The spoke node 206 may comprise a NIC 242, a plurality of processors 244a, 246a, and 248a, a plurality of remote applications 244b, 246b, and 248b, a system memory 250, and a bus 252. The NIC 242 may comprise a TOE 272, a memory 264, a network interface 262, and a bus 266. The TOE 272 may comprise a processor 274, a connection point 276, and a reliable multicast point 277.

The processor 214 may comprise suitable logic, circuitry, and/or code that may be utilized to transmit, receive and/or process data. The processor 214 may be utilized to control the operation of the hub node 202 and/or execute application code, for example a database application. The processor 214 may be coupled to a bus 222. The processor 214 may perform protocol processing when transmitting and/or receiving data via the bus 222. The protocol processing may be associated with an upper layer protocol, for example. An upper layer protocol may be utilized in connection with an application, for example. The processor 214 may also perform protocol processing related to the receipt of and subsequent distribution of multicast data within a multicast group.

The system memory 220 may comprise suitable logic, circuitry, and/or code that may be utilized to store, or write, and/or retrieve, or read, information, data, and/or executable code. The system memory 220 may comprise a plurality of as random access memory (RAM) technologies such as, for example, DRAM.

The NIC 212 may comprise suitable circuitry, logic and/or code that may enable the hub node 202 to transmit and/or receive data from a network, for example, an Ethernet network. The NIC 212 may be coupled to the network 102. The NIC 212 may be coupled to the bus 222. The NIC 212 may enable the hub node 202 to provide reliable multicasting of information from a spoke node 106a to a plurality of spoke nodes, 106a, 108a, 110a, and 112a, in a multicast group.

The TOE 241 may comprise suitable logic, circuitry, and/or code to perform protocol processing and/or provide a reliable multicast service within the hub node 202. In various embodiments of the invention, the TOE 241 may utilize a protocol stack that comprises a plurality of protocols. In an embodiment of the invention, the protocol stack may comprise a reliable multicast protocol. The reliable multicast protocol may enable the TOE 241 to receive multicast data from a data source. The data source may be associated with a multicast group. The reliable multicast protocol may enable the TOE 241 to subsequently communicate the received multicast data to a plurality of data destinations associated with the multicast group.

In an exemplary embodiment of the invention, the TOE 241 may utilize the multi-streamed marker based protocol data unit aligned (MST-MPA) protocol when communicating the received multicast data to the plurality of data destinations. In another exemplary embodiment of the invention, the TOE 241 may utilize the stream control transport protocol (SCTP) when communicating the received multicast data to the plurality of data destinations. The TOE 241 may utilize TCP to enable the reliable communication of the received multicast data to the plurality of data destinations. The multi-streaming aspect of the reliable multicast protocol may enable the TOE 241 to manage communication of the received multicast data to each of the plurality of data destinations utilizing a corresponding plurality of TCP tunnels, for example. A TCP tunnel may define an association among a group of TCP connections. A TCP tunnel established between the TOE 241 and one of a plurality of data destinations may comprise a plurality of TCP connections, for example. U.S. application Ser. No. 11/269,005 filed Nov. 8, 2005 provides additional information about TCP tunnels, which is hereby incorporated herein by reference in its entirety. The reliable communications aspect of the reliable multicast protocol may enable the TOE 241 to communicate the received multicast data to the plurality of data destinations, and to process acknowledgements associated with the communicated multicast data from each of the plurality of data destinations. U.S. application Ser. No. 11/269,422 filed Nov. 8, 2005 provides additional information about MST-MPA and SCTP, which is hereby incorporated herein by reference in its entirety.

The memory 234 may comprise suitable logic, circuitry, and/or code that may be utilized to enable storage and/or retrieval of information, data, and/or code. The memory multicast data. The stored multicast data may be assigned physical resources within the memory 234 for the storage. The stored multicast data may be subsequently available for retrieval. Retrieved multicast data may be output by the memory 234 and communicated to other devices, components, and/or subsystems that may be communicatively coupled, directly and/or indirectly, to the memory 234. The memory 234 may enable the stored multicast data to remain stored and/or available for subsequent retrieval until the resources allocated for the storage are deallocated. Physical resources may be deallocated based on a received instruction that the stored multicast data be erased from the memory 234, or based on a received instruction that the physical resources be allocated for the storage of subsequent binary information. The memory 234 may utilize a plurality of storage medium technologies such as volatile memory, for example random access memory (RAM), and/or nonvolatile memory, for example electrically erasable programmable read only memory (EEPROM).

The network interface 232 may comprise suitable logic, circuitry, and/or code that may be utilized to transmit and/or receive data via a network 102. The network interface may be coupled to the network 102. The network interface 232 may be coupled to the bus 236. The network interface 232 may receive bits via the bus 236. The bits may be associated with multicast data, for example. The network interface 232 may subsequently convert the bits to a data representation that comprises electrical and/or optical signals, with associated timing parameters, signal amplitude, energy, and/or power levels as specified by an appropriate specification for a network medium, for example, Ethernet. The data representation may also comprise one or more framing information bits that identify the start and/or end of the data representation. The data representation may be transmitted via the network 102.

The network interface 232 may receive signals via the network 102. The signals may comprise one or more framing information bits indicating the start and/or end of received data. Between the start of the data and the end of the data, the received signals may comprise a representation of bits that are associated with multicast data, for example. The received signals may be converted to a binary representation comprising bits based on detected electrical and/or optical signals, with associated timing parameters, signal amplitude, energy, and/or power levels as specified by an appropriate specification for a network medium, for example, Ethernet. The network interface 232 may subsequently transmit bits associated with binary information, for example multicast data bits, via the bus 236.

The processor 243 may comprise suitable logic, circuitry, and/or code that may be utilized to perform at least a portion of protocol processing tasks within the TOE 241 related to reliable distribution of multicast data within a multicast group.

The reliable multicast point 247 may comprise a computer program and/or code that may be executable by the processor 243, which may be utilized for receiving data from a spoke node, or data source, and multicasting the received data to a plurality of spoke nodes, or data destinations, in a multicast group. The reliable multicast point 247 may utilize point-to-point connections provided through the connection point 245 to relay messages received from one spoke node to a plurality of spoke nodes in a multicast group, and to consolidate acknowledgements received from the spoke nodes to generate a single acknowledgement, which may be communicated to the data source.

The reliable multicast point 247 may be utilized to receive a datagram comprising data from a data source via a reliable point to point connection, such as a TCP tunnel and/or TCP connection. The reliable multicast point 247 may be utilized to allocate resources that may be utilized for storage of the received datagram.

The received datagram may comprise an incoming sequence number. The incoming sequence number may be associated with the TCP tunnel and/or TCP connection, for example. The reliable multicast point 247 may be utilized to translate the incoming sequence number to a global sequence number. The global sequence number may be utilized by the reliable multicast point 247 to organize a plurality of datagrams received via, for example, one or more TCP tunnels and/or TCP connections for subsequent distribution within a multicast group.

The reliable multicast point 247 may be utilized to establish and/or maintain a table of offset differentials. The table of offset differentials may comprise a plurality of offset values corresponding to the plurality of data destinations associated with the multicast group. The reliable multicast point 247 may select an offset value corresponding to a selected data destination within the multicast group. The selected offset value may be added to the value for the global sequence number associated with a datagram to compute an outgoing sequence number associated with the datagram. The datagram, with associated outgoing sequence number, may be subsequently communicated to the selected data destination. The datagram with associated outgoing sequence number may utilize, for example, a TCP tunnel and/or TCP connection to communicate the datagram to the data destination.

The reliable multicast point 247 may be utilized to allocate resources that may be utilized for storage of state information related to the communication of the datagram to the data destination. For example, the state information may indicate that a datagram associated with an outgoing sequence number has been communicated to a data destination via, for example, a TCP tunnel and/or TCP connection. The state information may also indicate that an acknowledgement for receipt of the datagram from the data destination is pending, for example.

The reliable multicast point 247 may be utilized to repeat the above procedure when communicating the datagram to subsequent data destinations within the multicast group. After communicating the datagram to each of the data destinations within the multicast group, the reliable multicast point 247 may be utilized to deallocate resources previously allocated to the storage of the previously received datagram.

The reliable multicast point 247 may attach identification to each message that may enable an original source of the message will be known to the receiver. When an underlying reliable point to protocol has a "multi-streaming" capability, such as with SCTP or MST-MPA, the reliable multicast point 247 may translate a source identifier to a stream identifier. When the underlying reliable point to point protocol has no such capability it may encapsulate the original message in an envelope that includes identification of the original source in addition to the original message.

The reliable multicast point 247 may be utilized to receive an acknowledgement for successful receipt of the communicated datagram, via a reliable point to point protocol, from the data destination. The corresponding outgoing sequence number may be communicated in the received acknowledgement. The reliable multicast point 247 may be utilized to modify the corresponding state information based on the received acknowledgement. The modified state information may indicate that the acknowledgement for receipt of the previously communicated datagram has been received from the corresponding data destination, for example.

The reliable multicast point 247 may be utilized to repeat the above procedure when receiving an acknowledgement from a subsequent data destination within the multicast group. After receiving an acknowledgement from each of the data destinations within the multicast group, the reliable multicast point 247 may be utilized to communicate an acknowledgement to the data source via, for example, a TCP tunnel and/or TCP connection.

The connection point 245 may comprise a computer program and/or code may be executable by the processor 243, which may be utilized to perform TCP protocol processing, for example. Exemplary protocol processing may comprise establishment of TCP tunnels.

The network interface 262 may be substantially as described for the network interface 232. The network interface 262 may be coupled to the bus 266. The network interface 262 may be coupled to the network 102. The memory 264 may be substantially as described for the memory 234. The memory 264 may be coupled to the bus 266. The processor 274 may be substantially as described for the processor 243. The connection point 276 may be substantially as described for the connection point 245. The system memory 250 may be substantially as described for the system memory 220. The system memory 250 may be coupled to the bus 252.

The processor 244a may comprise suitable logic, circuitry, and/or code that may be utilized to transmit, receive and/or process data. The processor 244a may execute applications code, for example, a database application. The processor 244a may be coupled to a bus 252. The processor 244a may also perform protocol processing related to the communication of multicast data for subsequent distribution within a multicast group.

The local application 244b may comprise code that may be executable by the processor 244a to enable the processor 244a to perform functions related to one or more applications, for example a database application. The local application 244b may also cause the processor 244a to perform steps related to the communication of multicast data for subsequent distribution within a multicast group.

The processor 246a may be substantially as described for the processor 244a. The processor 246a may be coupled to the bus 252. The local application 246b may be substantially as described for the local application 244b. The processor 248a may be substantially as described for the processor 244*a*. The processor 248*a* may be coupled to the bus 252. The local application 248*b* may be substantially as described for the local application 244*b*.

The NIC 242 may comprise suitable circuitry, logic and/or code that may enable the spoke node 206 to transmit and/or receive data from a network, for example, an Ethernet network. The NIC 242 may be coupled to the network 102. The NIC 242 may be coupled to the bus 252. The NIC 212 may enable the spoke node 206 to provide reliable communication of information to a hub node 104 that may subsequently multicast the information to a plurality of spoke nodes, 106*a*, 108*a*, 110*a*, and 112*a*, in a multicast group.

The TOE 272 may comprise suitable circuitry, logic, and/or code to perform protocol processing and/or provide a reliable multicast service within the spoke node 206. The TOE 272 may be coupled to the bus 252. The TOE 272 may be coupled to the bus 266. In various embodiments of the invention, the TOE 272 may utilize a protocol stack that comprises a plurality of protocols. In an embodiment of the invention, the protocol stack may comprise a reliable multicast protocol. The reliable multicast protocol may enable the TOE 272 to communicate source data to a hub node 104. The reliable multicast protocol may also enable the TOE 272 to communicate corresponding information, which instructs the hub node 104 to multicast the communicated source data to each spoke node 106*a*, 108*a*, 110*a*, and 112*a* in the multicast group. The spoke node 206 and the hub node 104 may be associated with the multicast group.

The reliable multicast protocol may also enable the TOE 272 to subsequently receive an acknowledgement in response to the sending of source data to the hub node 104. A point to point transport protocol, for example TCP, may enable the TOE 272 to start a timer in connection with the sending of the source data to the hub node 104. Upon occurrence of an expiration event associated with the timer, the point to point transport protocol may enable the TOE 272 to resend the source data previously communicated to the hub node.

The reliable multicast protocol may also enable the TOE 272 to receive multicast data communicated from the hub node 104. The reliable multicast protocol may enable the TOE 272 to communicate an acknowledgement to the hub node 104 in response to receipt of the multicast data as provided for by the reliable point to point transport protocol In an exemplary embodiment of the invention, the TOE 272 may utilize the MST-MPA protocol when communicating source data to the hub node 104, and/or receiving multicast data from the hub node 104. In another exemplary embodiment of the invention, the TOE 272 may utilize the SCTP when communicating source data to the hub node 104, and/or receiving multicast data from the hub node 104. The TOE 272 may utilize TCP to enable the reliable communication of source data to the hub node 104, and/or reception of multicast data from the hub node 104. The multi-streaming aspect of the reliable multicast protocol may enable the TOE 272 to manage the communication of source data, and/or reception of multicast data utilizing one or more TCP tunnels, for example. In one aspect of the invention, the reliable multicast protocol may enable the TOE 272 to communicate source data to a hub node 104. In another aspect of the invention, the reliable multicast protocol may enable the TOE 272 to receive multicast data from the hub node 104.

The reliable multicast point 277 may comprise a computer program and/or code that may be executable by the processor 274, which may be utilized for communicating source data to a hub node 104, and/or receiving multicast data from the hub node 104. The reliable multicast point 277 may be utilized to communicate a datagram comprising the source data to the hub node 104 via a TCP tunnel and/or TCP connection. The reliable multicast point 277 may communicate information 104 in association with the datagram that instructs the hub node 104 to communicate the datagram to each of a plurality of spoke nodes within a multicast group. The reliable multicast point 277 may be utilized allocate resources that may be utilized for storing the communicated datagram. The resources may be allocated for the storage of the communicated datagram until at least a time instant at which a corresponding acknowledgement is received from the hub node 104. The communicated datagram may comprise a source sequence number. The source sequence number may be associated with a reliable point to point connection, for example.

The reliable multicast protocol 277 may be utilized to allocate resources that may be utilized for storage of state information related to the communication of the datagram to the hub node 104. For example, state information may indicate that a datagram associated with a source sequence number has been communicated to the hub node 104 via the reliable point to point protocol. Exemplary state information may also indicate that an acknowledgement is pending, for example. After receipt of the acknowledgement, the reliable multicast point 277 may be utilized to deallocate resources previously allocated to the storage of the previously communicated datagram.

The reliable multicast point 277 may be utilized to communicate an acknowledgement for successful receipt of multicast data, via the reliable point to point protocol, to the hub node 104 acknowledgement as is customary for the selected protocol.

In operation, the hub node 202 and spoke node 206 may be associated with a multicast group that comprises a plurality of spoke nodes. The remote application 244*b* may cause the processor 244*a* to communicate source information to the plurality of spoke nodes associated with the multicast group. The source information may be stored within the system memory 250. The processor 244*a* may issue an instruction to the system memory 250, which cases the system memory 250 to retrieve a copy of the source information, which may subsequently be communicated to the TOE 272 via the bus 252.

The reliable multicast point 277 may cause the processor 274 to utilize the source data to generate a datagram. The datagram may be associated with a source sequence number, which may be communicated within the datagram. The reliable multicast point 277 may cause the processor 274 to instruct the memory 264 to allocate resources for storage of the datagram. The reliable multicast point 277 may also cause the processor 274 to instruct the memory 264 to allocate resources for storage of state information related to the subsequent communication of the datagram to the hub node 202.

The connection point 276 may cause the processor 274 to perform steps leading to an establishment of a reliable point-to-point connection, which communicatively couples the connection point 276 within the spoke node 206, and the connection point 245 within the hub node 202. The reliable multicast point 277 may cause the connection point 276 to establish and/or select a point-to-point reliable connection, which is associated with a distribution of multicast data to each of the spoke nodes 206 within a multicast group.

The reliable multicast point 277 may cause the processor 274 to instruct the memory 264 to retrieve a copy of the datagram, which may subsequently be communicated to the network interface 262. The connection point 276 may cause the processor 274 to instruct the network interface 262 to utilize the selected reliable point to point connection to communicate the datagram to the hub node 202 via the network 102. The state information may be modified to indicate that a datagram associated with the source sequence number has been communicated to the hub node 202 via, for example, a selected TCP tunnel and/or TCP connection pending receipt of a corresponding acknowledgement from the hub node 202.

The reliable multicast point 277 may cause the processor 274 to start a timer at a time instant associated with the communication of the datagram. The timer may expire after a timeout time duration if an acknowledgement has not been received. If the timer expires, the reliable multicast point 277 may cause the processor 274 to perform steps causing the previously communicated datagram to be retransmitted to the hub node 102. The retransmission of the datagram may follow a process substantially as described above for the communication of the datagram. The state information may also comprise information related to the timer.

The network interface 232 within the hub node 202 may receive the datagram via the network 102. The connection point 245 may enable the processor 243 to determine that the datagram was received via, for example, a TCP tunnel and/or TCP connection, which indicates that the received datagram comprises information that may be distributed as multicast data to each of the plurality of spoke nodes 206 associated with the multicast group. The reliable multicast point 247 may cause the processor 243 to instruct the memory 234 to allocate resources for storage of the received multicast data. The reliable multicast point 247 may also cause the processor 243 to instruct the memory 234 to allocate resources for storage of state information related to the ensuing distribution of the multicast data within the multicast group. The state information may comprise incoming sequence number information, a value of which may be determined based on the received datagram. The state information may also comprise, for example, an identifier for the TCP tunnel and/or TCP connection from which the datagram was received. Prior to storing the received multicast data in the memory 234, the reliable multicast point 247 may cause the processor 243 to generate a global sequence number. The multicast data may be modified to contain the global sequence number.

The reliable multicast point 247 may cause the received multicast data to be communicated to each spoke node 206 associated with a multicast group. The reliable multicast point 247 may execute a process when communicating the multicast data to one spoke node 206 in the multicast group, which may be substantially equivalent to the process executed when communicating the multicast data to the remaining spoke nodes in the multicast group.

The reliable multicast point 247 may cause the processor 243 to communicate the multicast data to the spoke node 206. The reliable multicast point 247 may cause the processor 243 to instruct the memory 234 to retrieve a copy of the multicast data. The reliable multicast point 247 may cause the processor 243 to generate a table of offsets differentials. The processor 243 may select an offset value corresponding to the spoke node 206. The processor 243 may compute an outgoing sequence number based on the global sequence number, and the offset value. The retrieved copy of the multicast data may be modified to contain the outgoing sequence number. The reliable multicast point 247 may cause the processor 243 to utilize the modified retrieved copy of the multicast data to generate a multicast datagram.

The reliable multicast point 247 may also cause the processor to allocate resources for storage of state information related to the communication of the multicast datagram to the spoke node 206.

The connection point 245 may cause the processor 243 to perform steps leading to an establishment and/or selection of, for example, a TCP tunnel and/or TCP connection, which communicatively couples the connection point 245, and the connection point 276. The established and/or selected TCP tunnel and/or TCP connection may be utilized for communicating the multicast datagram from the hub node 202 to the spoke node 206.

The connection point 245 may cause the processor 243 to instruct the network interface 232 to utilize the selected TCP tunnel and/or TCP connection to communicate the multicast datagram to the spoke node 206 via the network 102. The state information associated with the multicast datagram may be modified to indicate that a multicast datagram associated with the outgoing sequence number has been communicated to the spoke node 206 via the selected TCP tunnel and/or TCP connection pending receipt of a corresponding acknowledgement from the spoke node 206.

The network interface 262 within the spoke node 206 may receive the multicast datagram via the network 102. The connection point 276 may enable the reliable multicast point 277 to cause the processor 274 to perform steps related to the receipt of the multicast datagram. The reliable point to point protocol may cause the processor 274 to generate an acknowledgement in response to receipt of the multicast datagram. The acknowledgement may be subsequently communicated to the reliable point to point protocol within the hub node 202. The reliable multicast point 277 may cause the processor 274 to communicate the outgoing sequence number information, contained within the received multicast datagram, within the acknowledgement. The acknowledgement may be communicated to the reliable multicast point 247 via, for example, a corresponding TCP tunnel and/or TCP connection.

The connection point 276 may cause the processor 274 to perform steps leading to a selection of, for example, a TCP tunnel and/or TCP connection, which communicatively couples the connection point 276, and the connection point 245. The reliable multicast point 277 may cause the connection point 276 to select, for example, a TCP tunnel and/or TCP connection for communicating the acknowledgement, based on the TCP tunnel and/or TCP connection, which was utilized for receipt of the corresponding received multicast datagram.

The reliable multicast point 277 may cause the processor 274 to instruct the network interface 262 to utilize the selected TCP tunnel and/or TCP connection to communicate the acknowledgement to the hub node 206 via the network 102.

The network interface 232 within the hub node 202 may receive the acknowledgement via the network 102. Information contained within the acknowledgement may be communicated to the reliable multicast point 247 via the connection point 245. The reliable multicast point 247 may utilize information contained within the acknowledgement to cause the processor 243 to modify state information associated with the corresponding multicast datagram. The reliable multicast point 247 may utilize sequence number information contained within the acknowledgement to identify the multicast datagram, which corresponds to the received acknowledgement. The modified state information may indicate receipt of the acknowledgement.

After communicating a copy of the retrieved multicast data to each of the spoke nodes 206 within the multicast group, the reliable multicast point 247 may cause the processor 243 to instruct the memory 234 to deallocate resources previously allocated for storage of the previously received datagram from the spoke node 206.

After receiving acknowledgements from each of the spoke nodes 206 within the multicast group, the reliable multicast point 247 may cause the processor 243 to generate an acknowledgement. The multipoint acknowledgement may be communicated to the reliable multicast point 277.

The reliable point to point protocol may cause the processor 243 to generate a local acknowledgement, which may be subsequently communicated to the spoke node 206. The reliable point to point protocol may cause the processor 243 to communicate an incoming sequence number within the acknowledgement via, for example, a corresponding TCP tunnel and/or TCP connection. The connection point 245 may cause the processor 243 to perform steps leading to a selection of, for example, a TCP tunnel and/or TCP connection, which communicatively couples the connection point 245 within the hub node 202, and the connection point 276 within the spoke node 206. The reliable multicast point 247 may cause the connection point 245 to select a TCP tunnel and/or TCP connection for communicating the acknowledgement, based on, for example, a TCP tunnel and/or TCP connection, which was utilized for receipt of the corresponding received datagram.

The reliable multicast point 247 may cause the processor 243 to instruct the network interface 232 to utilize the selected TCP tunnel and/or TCP connection to communicate the acknowledgement to the spoke node 206 via the network 102.

The network interface 262 within the spoke node 206 may receive the acknowledgement via the network 102. Information contained within the acknowledgement may be communicated to the reliable multicast point 277 via the connection point 276. The reliable multicast point 277 may utilize information contained within the acknowledgement to cause the processor 274 to modify state information associated with the corresponding datagram. The reliable multicast point 277 may utilize sequence number information contained within the acknowledgement to identify the datagram, which corresponds to the received acknowledgement. The modified state information may indicate receipt of the acknowledgement. The modified state information may prevent an expiration of the timer based on the timeout time duration.

After communicating the acknowledgement, the reliable multicast point 247 may cause the processor 243 to instruct the memory 234 to deallocate resources previously allocated for the storage of the corresponding state information.

Upon receipt of the acknowledgement, the reliable multicast point 277 may cause the processor 274 to instruct the memory stop the corresponding timer and to prevent an expiration of the timer based on the timeout time duration. The processor 274 may instruct the memory 264 to deallocate resources previously allocated for the storage of the previously communicated corresponding source information and/or corresponding state information.

Figure 3:
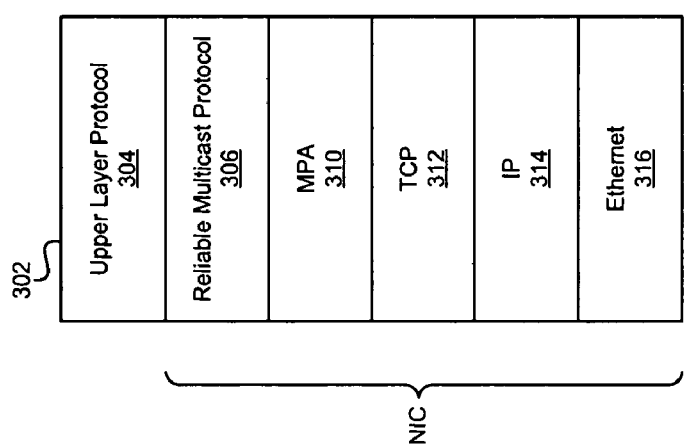
FIG. 3 is a diagram of an exemplary reliable multicast over MST-MPA protocol stack, in accordance with an embodiment of the invention.

FIG. 3 is a diagram of an exemplary reliable multicast over MST-MPA protocol stack, in accordance with an embodiment of the invention. Referring to FIG. 3, there is shown a reliable multicast over MST-MPA protocol stack 302. The reliable multicast over MST-MPA protocol stack 302 may comprise an upper layer protocol 304, a reliable multicast protocol 306, a direct data placement protocol (DDP) 308, a marker-based PDU aligned protocol (MPA) 310, a TCP 312, an IP 314, and an Ethernet protocol 316. A NIC 212 or 242 may comprise functionality associated with the reliable multicast protocol 306, DDP 308, MPA protocol 310, TCP 312, IP 314, and Ethernet protocol 316.

The upper layer protocol 304 may comprise methods that enable a spoke node 206 to select source information that may be communicated to each of the spoke nodes within a multicast group as multicast data. The reliable multicast protocol 306 specifies various methods that may enable a spoke node 206 to communicate multicast data to a hub node 202. The hub node 202 may subsequently communicate the multicast data to each spoke node within a multicast group associated with the spoke node 206. The DDP 308 may enable copying of information from an application user space in a spoke node 206 to an application user space in a hub node 202, for example, without performing an intermediate copy of the information to kernel space. This may be referred to as a "zero copy" model.

The MST-MPA protocol 310 may comprise methods that enable communication between a spoke node 206 and a hub node 202 via a TCP connection. The TCP 312, and IP 314 may comprise methods that enable information to be exchanged via a network according to applicable standards as defined by the Internet Engineering Task Force (IETF). The Ethernet 316 may comprise methods that enable information to be exchanged via a network according to applicable standards as defined by the IEEE.

Figure 4:
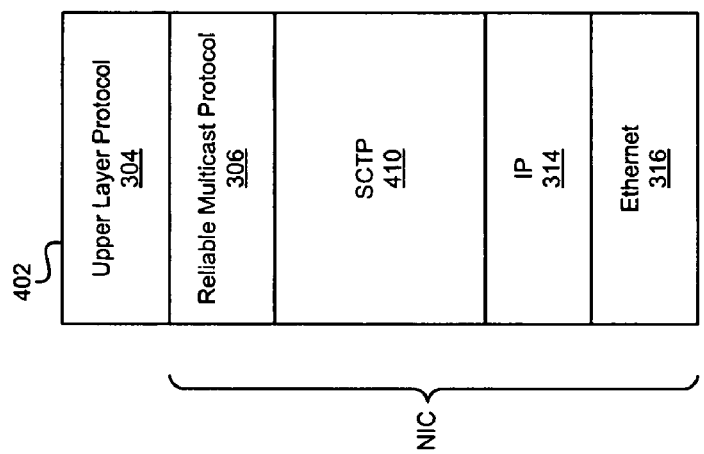
FIG. 4 is a diagram of an exemplary reliable multicast over SCTP protocol stack, in accordance with an embodiment of the invention.

FIG. 4 is diagram of an exemplary reliable multicast over SCTP protocol stack, in accordance with an embodiment of the invention. Referring to FIG. 4, there is shown a reliable multicast over SCTP protocol stack 402. The reliable multicast over SCTP protocol stack 402 may comprise an upper layer protocol 304, a reliable multicast protocol 306, a direct data placement protocol (DDP) 308, stream control transport protocol (SCTP) 410, an IP 314, and an Ethernet protocol 316. A NIC 212 or 242 may comprise functionality associated with the reliable multicast protocol 306, DDP 308, SCTP 410, IP 314, and Ethernet protocol 316. The upper layer protocol 304, reliable multicast protocol 306, DDP 308, IP 314, and Ethernet 316 may be substantially as described in FIG. 3. Aspects of the SCTP 410 may comprise functionality equivalent to the MPA protocol 310 and TCP 312.

U.S. application Ser. No. 11/269,422 filed Nov. 8, 2005 provides additional information about MST-MPA, SCTP and DDP, which is hereby incorporated herein by reference in its entirety.

Figure 5:
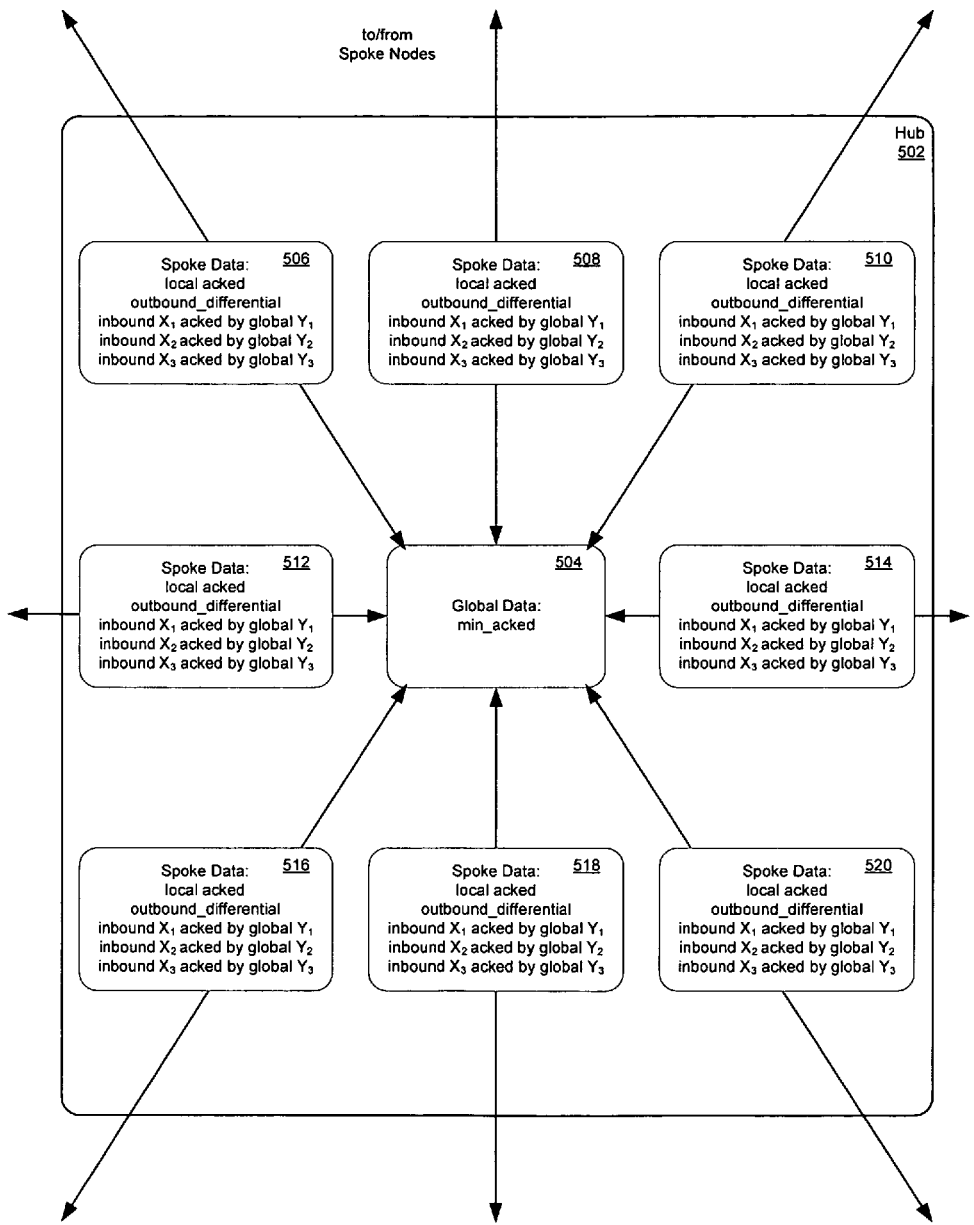
FIG. 5 is a diagram illustrating exemplary data structures for a system for reliable multicast datagrams, in accordance with an embodiment of the invention.

FIG. 5 is a diagram illustrating exemplary data structures for a system for reliable multicast datagrams, in accordance with an embodiment of the invention. Referring to FIG. 5, there is shown a hub 502. The hub may comprise global data 504, and a plurality of spoke data 506, 508, 510, 512, 514, 516, 518, and 520. The hub 502 may represent the hub node 202 illustrated in FIG. 2. The plurality of spoke data 506, 508, 510, 512, 514, 516, 518, and 520 may correspond to a plurality of spoke nodes 206 associated with a multicast group. The spoke data may comprise state information related to communication between the hub node 202 and a corresponding spoke node 206. The global data 504 may comprise state information related to communication between the hub node 202, and the plurality of spoke nodes as a multicast group. The hub 502 may communicate with a the plurality of spoke nodes 206 corresponding to the plurality of spoke data 506, 508, 510, 512, 514, 516, 518, and 520 via one or more TCP tunnels and/or TCP connections.

An example of global data 504 may comprise the group of acknowledgements received by the hub node 202 in response to a distribution of multicast data to each of the spoke nodes 206 within the multicast group. The hub node 202 may communicate a multicast datagram to each spoke node 206 in the multicast group. The hub node 202 may maintain global data, which comprises state information that indicates which spoke nodes within the multicast group have acknowledged receipt of a multicast datagram. An acknowledgement may be communicated by the hub node 202 based on global data, for example.

Examples of spoke data may comprise information contained in acknowledgements communicated by the hub node 202 in response to receipt of datagrams comprising multicast data, and sequence numbers associated with datagrams and/or acknowledgements communicated between the hub node and a corresponding spoke node 206. An outbound differential may be associated with each spoke data block. The outbound differential may represent an offset value, which corresponds to a spoke node 206 within a multicast group. Spoke data may also comprise incoming sequence numbers, represented by inbound $X_1$, inbound $X_2$, and inbound $X_3$, associated with datagrams $D_1$, $D_2$, and $D_3$, received from a given spoke node 206. The values associated with inbound $X_1$, inbound $X_2$, and inbound $X_3$, for the spoke data block 506 may be different from the corresponding values associated with inbound $X_1$, inbound $X_2$, and inbound $X_3$, for the spoke data block 508, for example. The corresponding incoming sequence numbers inbound $X_1$, inbound $X_2$, and inbound $X_3$, may be translated to global sequence numbers global $Y_1$, global $Y_2$, and global $Y_3$ within each spoke data block. Based on the outbound differential value associated with the corresponding spoke data block, and the global sequence number value, outgoing sequence numbers may be computed for each multicast datagram communicated by the hub node 202 to a corresponding spoke node 206.

Figure 6A:
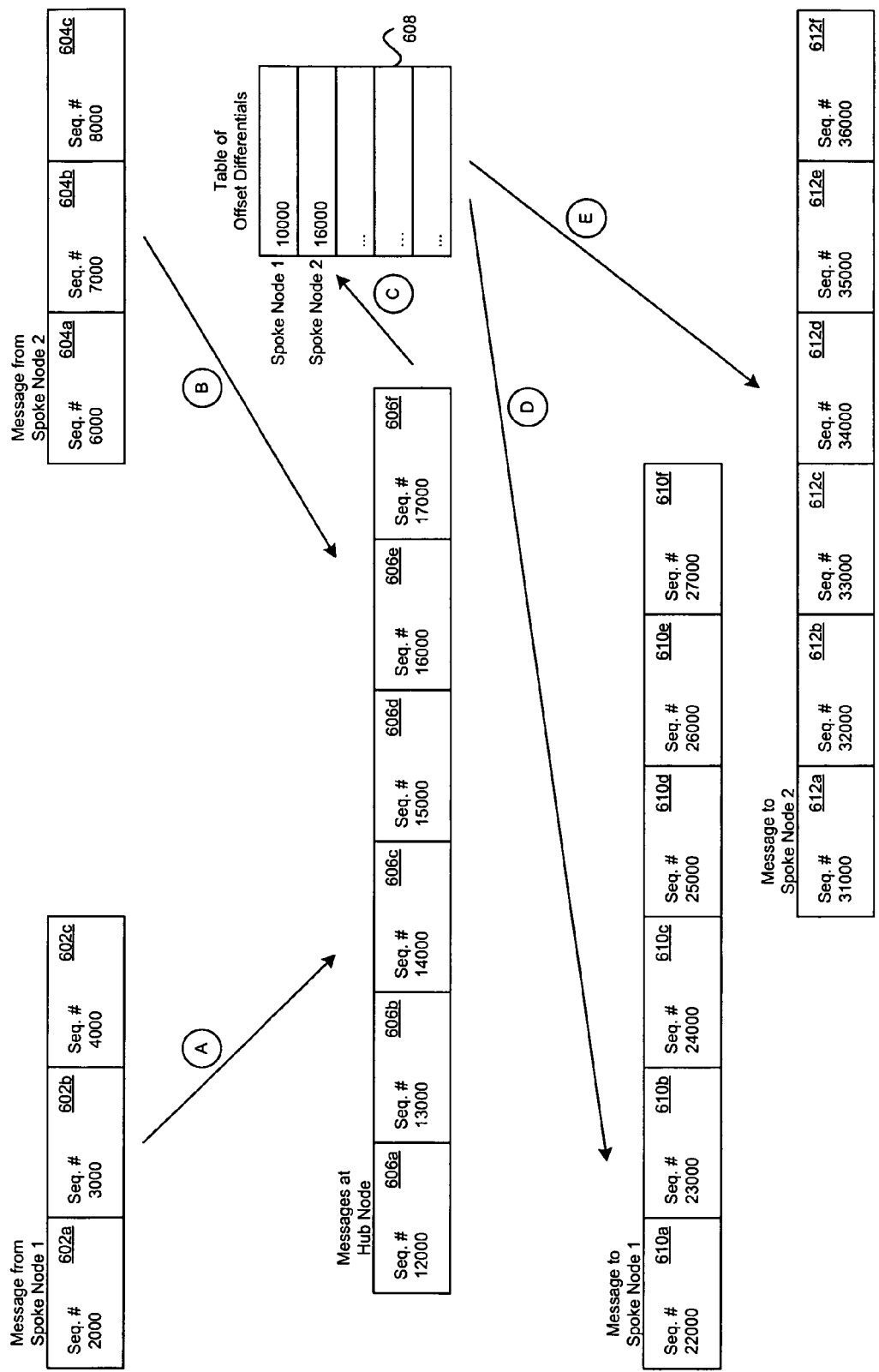
FIG. 6A is an exemplary illustration of distribution of multicast datagrams in a system for reliable multicast datagrams, in accordance with an embodiment of the invention.

FIG. 6A is an exemplary illustration of distribution of multicast datagrams in a system for reliable multicast datagrams, in accordance with an embodiment of the invention. Referring to FIG. 6A, there is shown an exemplary plurality of datagrams 602a, 602b, 602c, 604a, 604b, 604c, 606a, 606b, 606c, 606d, 606e, 606f, 610a, 610b, 610c, 610d, 610e, 610f, 612a, 612b, 612c, 612d, 612e, 612f, and an exemplary table of offset differentials 608. The plurality of datagrams 602a, 602b, 602c, 604a, 604b, and 604c may comprise multicast data that may be distributed by a hub node to a plurality of spoke nodes within a multicast group. An exemplary multicast group may comprise a hub node 104, and spoke nodes 106a, and 108a. The plurality of datagrams 602a, 602b, and 602c may be communicated by the spoke node 106a to the hub node 104 as indicated by the label A. The plurality of datagrams 604a, 604b, and 604c may be communicated by the spoke node 108a to the hub node 104 as indicated by the label B.

The datagram 602a may comprise an exemplary incoming sequence number 2000. The datagram 602b may comprise an exemplary incoming sequence number 3000. The datagram 602c may comprise an exemplary incoming sequence number 4000. The datagram 604a may comprise an exemplary incoming sequence number 6000. The datagram 604b may comprise an exemplary incoming sequence number 7000. The datagram 604c may comprise an exemplary incoming sequence number 8000.

Upon receipt of the plurality of datagrams 602a, 602b, and 602c, from the spoke node 106a, the hub node 104 may generate global sequence numbers. The datagram 602a may correspond to the datagram 606a. The exemplary incoming sequence number 2000 may be translated to a global sequence number 12000. The datagram 602b may correspond to the datagram 606b. The exemplary incoming sequence number 3000 may be translated to a global sequence number 13000. The datagram 602c may correspond to the datagram 606c. The exemplary incoming sequence number 4000 may be translated to a global sequence number 14000.

Upon receipt of the plurality of datagrams 6042a, 604b, and 604c, from the spoke node 108a, the hub node 104 may generate global sequence numbers. The datagram 604a may correspond to the datagram 606d. The exemplary incoming sequence number 6000 may be translated to a global sequence number 15000. The datagram 604b may correspond to the datagram 606e. The exemplary incoming sequence number 7000 may be translated to a global sequence number 16000. The datagram 604c may correspond to the datagram 606f. The exemplary incoming sequence number 8000 may be translated to a global sequence number 17000.

The hub node 104 may distribute the plurality of datagrams 606a, 606b, 606c, 606d, 606e, and 606f may be communicated to each of the spoke nodes 106a and 108a within the multicast group.

The hub node 104 may determine offset values corresponding to spoke nodes 106a and 108a respectively by referencing values contained within the table of offset differentials 608 as indicated by label C. An exemplary offset value corresponding to the spoke node 106a may be 10000. An exemplary offset value corresponding to the spoke node 108a may be 16000.

Based on the global sequence numbers associated with the datagrams 606a, 606b, 606c, 606d, 606e, and 606f, and the exemplary offset value associated with the spoke node 106a, the hub node 104 may compute outgoing sequence numbers for the multicast datagrams, which may be communicated to the spoke node 106a. The plurality of datagrams 610a, 610b, 610c, 610d, 610e, and 610f may be communicated to the spoke node 106a as indicated by label D.

The datagram 610a may comprise an exemplary outgoing sequence number 22000. The datagram 610b may comprise an exemplary outgoing sequence number 23000. The datagram 610c may comprise an exemplary outgoing sequence number 24000. The datagram 610d may comprise an exemplary outgoing sequence number 25000. The datagram 610e may comprise an exemplary outgoing sequence number 26000. The datagram 610f may comprise an exemplary outgoing sequence number 27000.

Based on the global sequence numbers associated with the datagrams 606a, 606b, 606c, 606d, 606e, and 606f, and the exemplary offset value associated with the spoke node 108a, the hub node 104 may compute outgoing sequence numbers for the multicast datagrams, which may be communicated to the spoke node 108a. The plurality of datagrams 612a, 612b, 612c, 612d, 612e, and 612f may be communicated to the spoke node 108a as indicated by label E.

The datagram 612a may comprise an exemplary outgoing sequence number 31000. The datagram 612b may comprise an exemplary outgoing sequence number 32000. The datagram 612c may comprise an exemplary outgoing sequence number 33000. The datagram 612d may comprise an exemplary outgoing sequence number 34000. The datagram 612e may comprise an exemplary outgoing sequence number 35000. The datagram 612f may comprise an exemplary outgoing sequence number 36000.

Figure 6B:
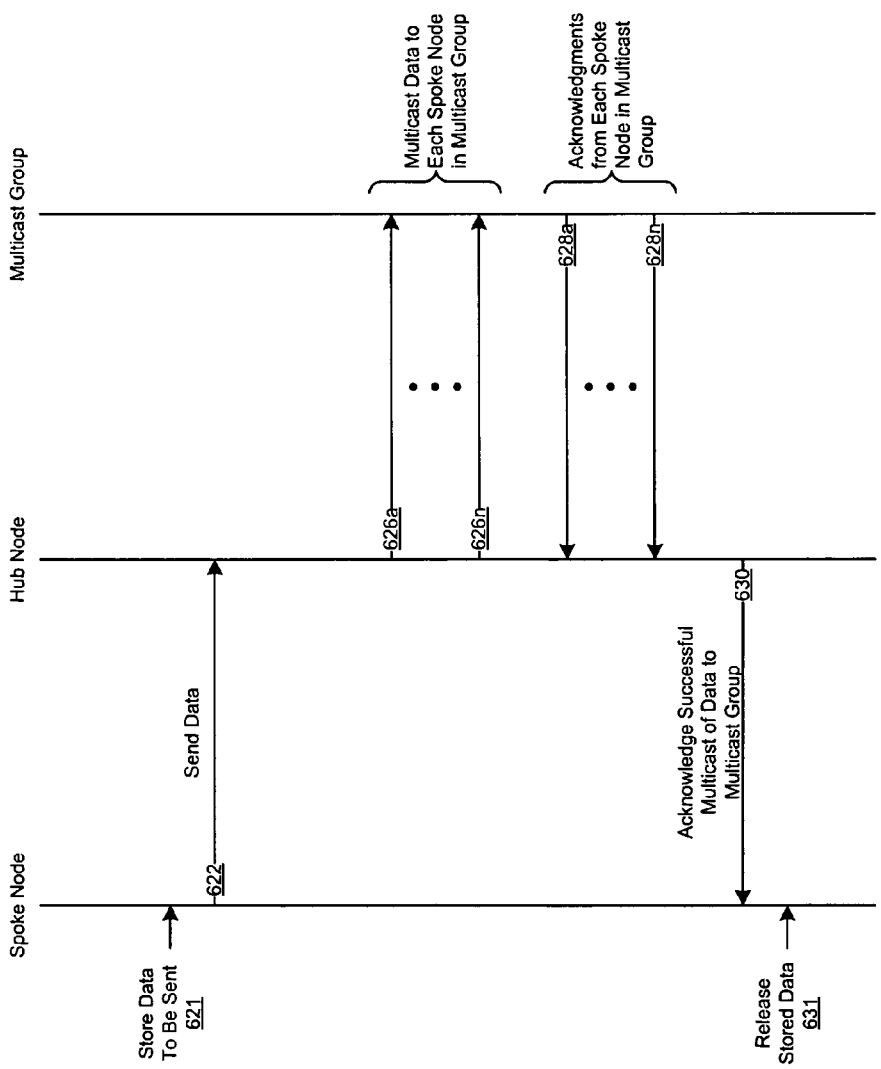
FIG. 6B is an exemplary flowchart illustrating message exchanges in a system for reliable multicast datagrams, in accordance with an embodiment of the invention.

FIG. 6B is an exemplary flowchart illustrating message exchanges in a system for reliable multicast datagrams, in accordance with an embodiment of the invention. Referring to FIG. 6B, there is shown an exchange of messages between an originating spoke node and a hub node, and an exchange of messages between the hub node and the multicast group, where the originating spoke node, hub node, and multicast group are as labeled in FIG. 6B. The originating spoke node may represent a spoke node which communicates multicast data to the hub node, which is subsequently distributed via a plurality of multicast datagrams to the corresponding plurality of spoke nodes associated with the multicast group. The multicast group may comprise a plurality of spoke nodes.

In step 621, the originating spoke node may store source data, which is to be communicated to the hub node. Resources may be allocated within the originating spoke node for the storage of the source data. In step 622, the originating spoke node may communicate a datagram comprising the source data to the hub node. In steps 626a, . . . , 626n, the hub node may communicate a corresponding multicast datagram to each of the spoke nodes associated with the multicast group. In steps 628a, . . . , 628n, each of the recipient spoke nodes may communicate an acknowledgement to the hub node in response to receipt of the corresponding multicast datagram. In step 630, the hub node may communicate an acknowledgement to the originating spoke node. In step 631, the originating spoke node may release resources previously allocated for the storage of the source data.

Figure 7:
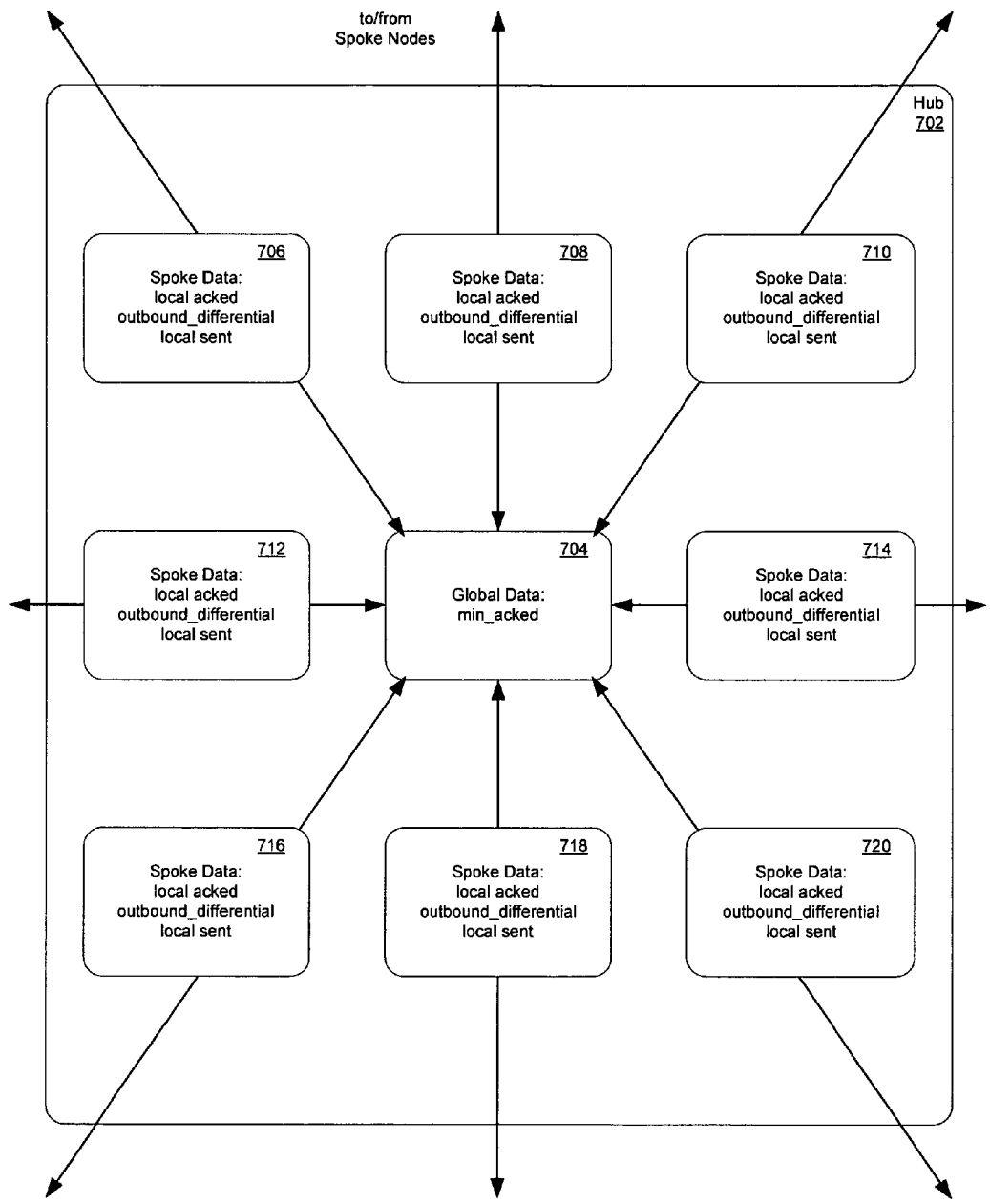
FIG. 7 is an exemplary illustration of data structures for a system for barriers, in accordance with an embodiment of the invention.

In another embodiment of the invention, the hub node 104 may be utilized to enable synchronization in distributed cluster computing systems. FIG. 7 is an exemplary illustration of data structures for a system for barriers, in accordance with an embodiment of the invention. Referring to FIG. 7, there is shown a hub 702. The hub may comprise global data 704, and a plurality of spoke data 706, 708, 710, 712, 714, 716, 718, and 720. The hub 702 may represent a hub node 202. The plurality of spoke data 706, 708, 710, 712, 714, 716, 718, and 720 may correspond to a plurality of spoke nodes 206 associated with a multicast group. The spoke data may comprise state information related to epochs, or fenceposts, which indicate a status of a computing task being performed by a spoke node within a cluster computing environment. The global data may comprise state information related to an epoch, or fencepost, which is a status marker indicating a minimum processing stage number which has been completed by each of the spoke nodes within the cluster computing environment.

A spoke node 106a may complete an epoch, which corresponds to a fencepost associated with a status marker. The spoke node 106a may communicate a progress message to the hub node 104. In response, the hub node 104 may communicate an acknowledgement message to the spoke node 106a. The progress message may comprise information based on the status marker. The spoke data 706 associated with the spoke node 106a may maintain state information, local_sent, based on the status marker. The global data 704 may comprise information related to a minimum processing stage number, which has been completed by each of the spoke nodes within the cluster computing environment.

Associated with each spoke data block may be an outbound differential. The outbound differential may represent an offset value, which corresponds to a spoke node 206 within a cluster computing environment. In various embodiments of the invention, the value associated with the outbound differential may be 0 for each spoke data block 706, 708, 710, 712, 714, 716, 718, and 720, for example. Based on the minimum processing stage information associated with the global data 704, and the local_sent state information associated with the spoke data 706, a relative minimum status marker may be computed for each spoke data block, local_acked. The acknowledgement message communicated to each spoke node 206 in the computing cluster environment may comprise a corresponding relative minimum status marker value, local_acked.

Figure 8:
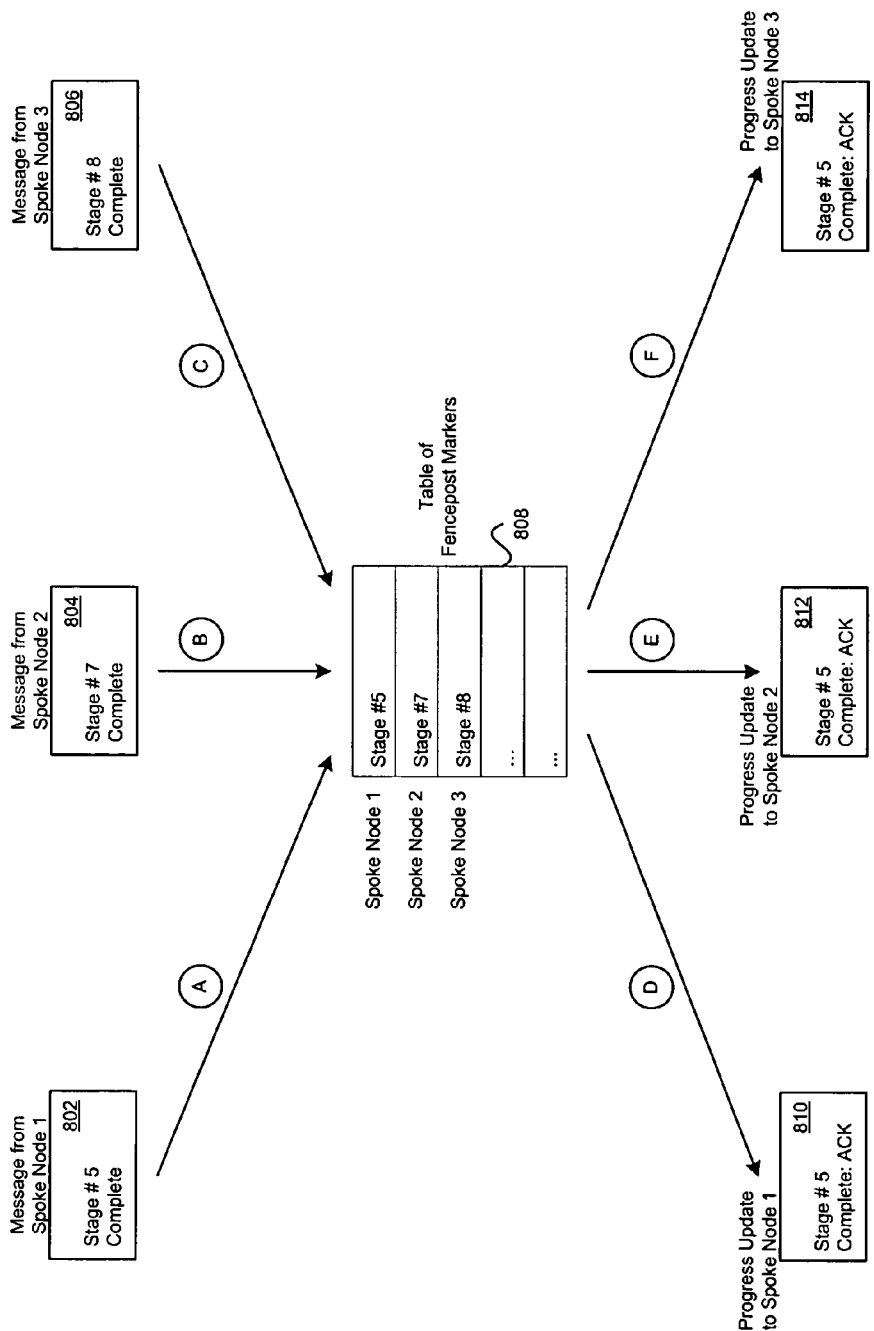
FIG. 8 is a diagram illustrating exemplary distribution of status marker information in a system for barriers, in accordance with an embodiment of the invention.

FIG. 8 is a diagram illustrating exemplary distribution of status marker information in a system for barriers, in accordance with an embodiment of the invention. Referring to FIG. 8, there is shown a plurality of progress messages 802, 804, and 806, a table of fencepost markers 808, and a plurality of progress update messages 810, 812, and 814. The progress update message 810 may correspond to the progress message 802. The progress update message 812 may correspond to the progress message 804. The progress update message 814 may correspond to the progress message 806.

A spoke node 106a may communicate a progress message 802 to the hub node 104, as indicated in label A. The progress message 802 may comprise a status marker value indicating that the spoke node 106a has completed stage 5 of a computing task. A spoke node 108a may communicate a progress message 804 to the hub node 104, as indicated in label B. The progress message 804 may comprise a status marker value indicating that the spoke node 108a has completed stage 7 of a computing task. A spoke node 110a may communicate a progress message 806 to the hub node 104, as indicated in label C. The progress message 806 may comprise a status marker value indicating that the spoke node 108a has completed stage 7 of a computing task.

The hub node 104 may receive each of the progress messages 802, 804, and 806. The corresponding status marker values may be stored in a table of fencepost markers 808. Entries in the table of fencepost markers 808 may correspond to spoke nodes within a cluster computing environment. For example, status marker value stage_5 may be associated with the spoke node 106a, status marker value stage_7 may be associated with the spoke node 108a, and status marker value stage_8 may be associated with the spoke node 110a.

The hub node 104 may inspect the values associated with each of entries within the table of fencepost markers 808 to determine a minimum processing stage number. For example, an exemplary minimum stage number may be stage_5. The hub node 104 may communicate a progress update message 810 in response to receipt of the progress message 802 from the spoke node 106a. The progress update message 810 may comprise the minimum stage number value, stage_5, based on the contents of the table of fencepost markers 808. The progress update message 810 may be communicated to the spoke node 106a, as indicated in label D. The hub node 104 may communicate a progress update message 812 in response to receipt of the progress message 804 from the spoke node 108a. The progress update message 812 may comprise the minimum stage number value, stage_5, based on the contents of the table of fencepost markers 808. The progress update message 812 may be communicated to the spoke node 108a, as indicated in label E. The hub node 104 may communicate an progress update message 814 in response to receipt of the progress message 806 from the spoke node 110a. The progress update message 814 may comprise the minimum stage number value, stage_5, based on the contents of the table of fencepost markers 808. The progress update message 814 may be communicated to the spoke node 110a, as indicated in label F.

Figure 9:
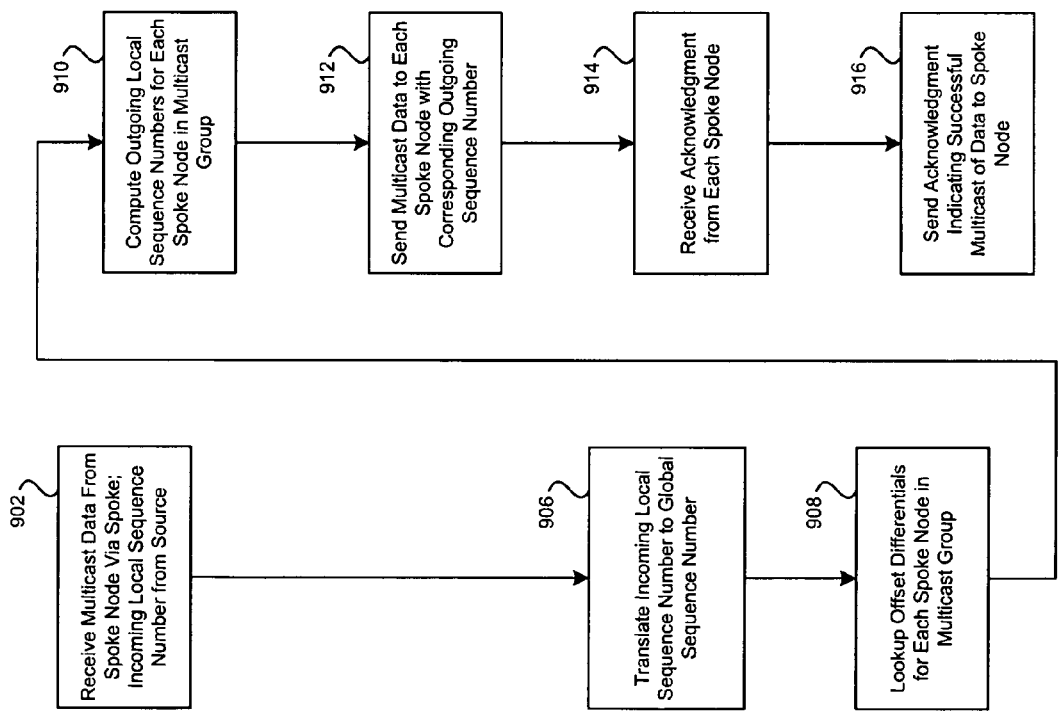
FIG. 9 is a flowchart illustrating exemplary steps for a method for reliable multicast datagrams, in accordance with an embodiment of the invention.

FIG. 9 is a flowchart illustrating exemplary steps for a method for reliable multicast datagrams, in accordance with an embodiment of the invention. Referring to FIG. 9, in step 902, a hub node 104 may receive multicast data from an originating spoke node 106a. The communicative coupling between a hub node and a spoke node may be referred to as a spoke. The received multicast data may comprise a local sequence number.

In step 906, the hub node 104 may translate the incoming local sequence number associated with the received multicast data to a global sequence number. In step 908, the hub node 104 may perform a lookup operation to determine an offset differential value associated with each spoke node 106a, 108a, 110a, and 112a, within a multicast group. A corresponding outgoing sequence number may be computed. In step 912, a multicast datagram, comprising the multicast data, may be communicated to each spoke node within the multicast group. A corresponding outgoing sequence number may be associated with each multicast datagram. In step 914, the hub node 104 may receive an acknowledgement in response to each corresponding multicast datagram. In step 916, the hub node 104 may communicate an acknowledgement to the originating spoke node 106a.

Figure 10:
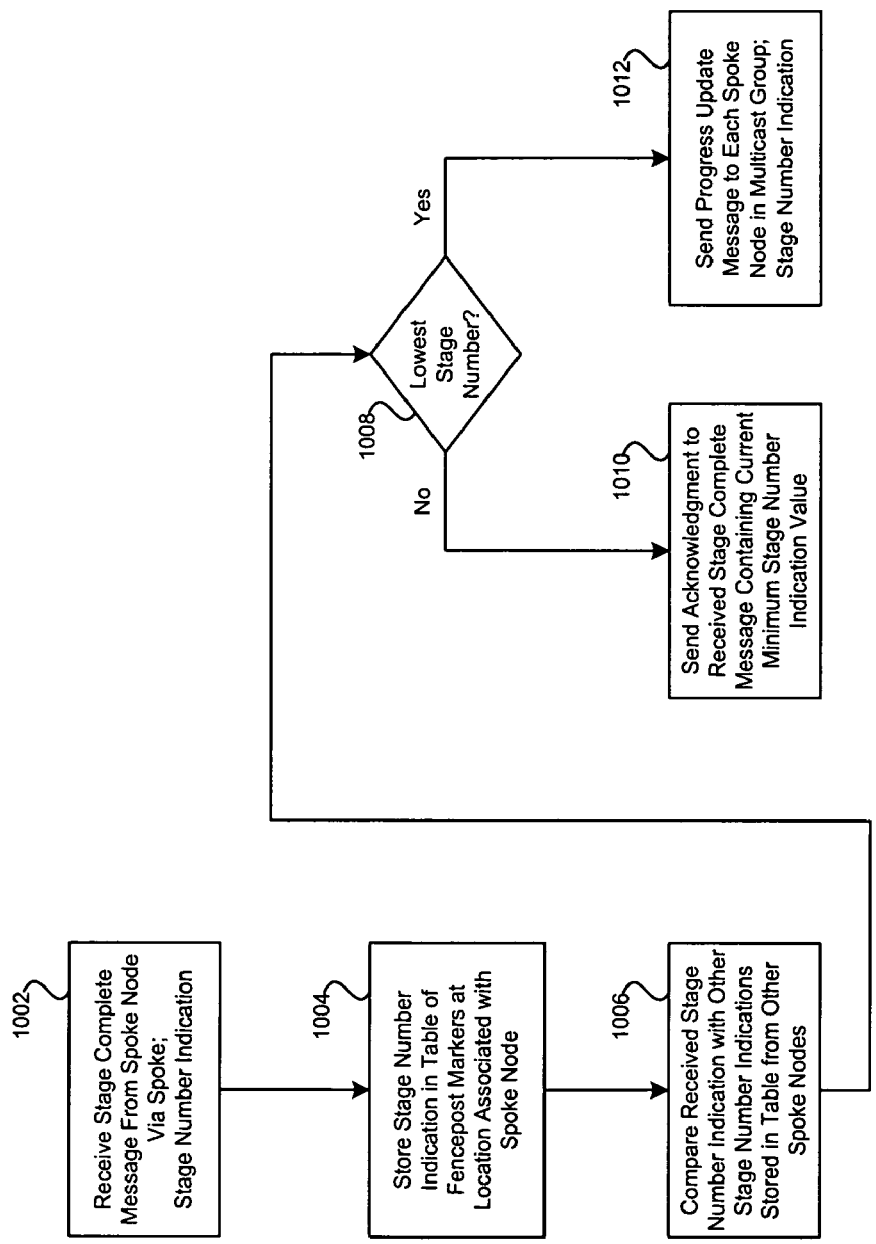
FIG. 10 is a flowchart illustrating exemplary steps for a method for barriers, in accordance with an embodiment of the invention.

FIG. 10 is a flowchart illustrating exemplary steps for a method for barriers, in accordance with an embodiment of the invention. Referring to FIG. 10, in step 1002, the hub node 104 may receive a progress message from a spoke node 106a via a spoke. The progress message may comprise a stage number indication. In step 1004, the hub node 104 may store the received stage number indication in a table of fencepost markers 808 at a location, which is associated with the spoke node 106a. In step 1006, a value for the received stage number indication may be compared to values for other stage number indications, which may be stored within the table of fencepost markers 808. The other stage number indications may be received in information communicated from other spoke nodes.

Step 1008 may determine whether the received stage number indication value represents the lowest stage number value stored within the table of fencepost markers 808. If so, in step 1012 the hub node 104 may communicate a progress update message to the spoke node 106a, which comprises a minimum stage number value based on the received stage number indication value from step 1002. The minimum stage number value may subsequently be communicated by the hub node 104 in progress update messages sent to other spoke nodes in response to received progress messages.

If step 1008 determines that the received stage number indication value may not represent the lowest stage number value stored within the table of fencepost markers 808, in step 1010, the hub node 104 may communicate an acknowledgement message to the spoke node 106a, which comprises the current minimum stage number value.

Aspects of a system for communicating information via a communications system may comprise a hub 202 that enables storage of data received from a data source located in a multicast group. An exemplary multicast switching device may comprise a hub 202. An exemplary data source may comprise a spoke node 106a. An exemplary multicast group may comprise the plurality of spoke nodes 106a, 108a, 110a, and 112a. The storage of the received data may require an allocation of resources at the hub 202, for example, in the memory 234. The hub 202 may enable multicast of the received data to a plurality of data destinations in the multicast group. Exemplary data destinations may comprise the plurality of spoke nodes 106a, 108a, 110a, and 112a. The hub 202 may release at least a portion of resources allocated to storing the received data. The released resources may comprise at least a portion of the memory 234, for example. The release of the resources may not immediately result in removal, or erasure, of the received data stored in the released resources, but the released resources may subsequently be utilized for other purposes, for example to store subsequent data. In response to receiving an acknowledgement from each of the plurality of data destinations, the hub 202 may enable an acknowledgement to be sent to the data source.

The data may comprise an incoming local sequence number. The hub 202 may enable translation of the incoming local sequence number to a global sequence number. An offset differential may be determined, which corresponds to each of the plurality of data destinations. The hub 202 may enable computation of an outgoing local sequence number for each one of the plurality of data destinations based on the corresponding offset differential. The multicasting of the received data may comprise the computed outgoing local sequence number corresponding to each one of the plurality of data destinations.

In another aspect of the system, the hub 202 may enable reception of a progress message from a station member in the multicast group. The progress message may comprise a stage number indication. An exemplary station member may comprise a spoke node 106a. The stage number indication may indicate completion of processing associated with a corresponding epoch. The hub 202 may enable comparison of a value associated with the stage number indication to values associated with stored information. The stored information may comprise values associated with progress messages received from other station members in the multicast group. Based on the comparison, the hub 202 may enable, in response to the progress message, either: an acknowledge message to be sent to the station member, or a progress update message to be sent to each station member in the multicast group. The progress update message sent to the station member that previously sent the progress message may comprise an acknowledgement.

Various embodiments of the invention may utilize any of a plurality of reliable transport protocols for communication between a spoke node and a hub node. Messages multicast via a reliable transport protocol may preserve message boundaries, and may identify an original source for messages. For example, MST-MPA and SCTP may represent exemplary reliable transport protocols, which may be utilized to preserve message boundaries and enable messages to be assigned to distinct streams. The multicast protocol may assign each stream for use by a single source endpoint, for example.

When TCP is utilized as a reliable transport protocol an envelope may be defined in connection with the multicast messages. The envelope may comprise a length for the message, an originating source, and data to be multicast.

The encoding of multicast fence messages from the hub node to the spoke node may be simplified when utilizing TCP, for example. For example, the message length may be fixed. An exemplary message length may comprise a single byte. The message may enable an associated advance of a message sequence counter, for example. In embodiments, which utilize MST-MPA or SCTP, for example, the message may comprise 0 payload bytes.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information via a communications system, the method comprising:
   storing within a multicast switching device, data received from a data source located in a multicast group;
   multicasting said received data to a plurality of data destinations in said multicast group;
   releasing, responsive to said multicasting, at least a portion of data storage resources allocated to said storing said received data within said multicast switching device prior to receiving an acknowledgement of receiving the data from each of said plurality of data destinations; and
   in response to receiving said acknowledgement from each of said plurality of data destinations, sending an acknowledgement to said data source.

2. The method according to claim 1, wherein said received data comprises an incoming local sequence number.

3. The method according to claim 2, comprising translating said incoming local sequence number to a global sequence number.

4. The method according to claim 3, comprising determining an offset differential corresponding to each one of said plurality of data destinations.

5. The method according to claim 4, comprising computing an outgoing local sequence number for said each one of said plurality of data destinations based on said corresponding offset differential.

6. The method according to claim 5, wherein said multicasting said received data comprises said computed outgoing local sequence number corresponding to said each one of said plurality of data destinations.

7. The method according to claim 1, comprising receiving a progress message from a station member in said multicast group, wherein said progress message comprises a stage number indication.

8. The method according to claim 7, comprising comparing a value associated with said stage number indication to values associated with stored information.

9. The method according to claim 8, comprising sending an acknowledgement message, in response to said received progress message, to said station member based on said comparing.

10. The method according to claim 9, comprising sending a progress update message, in response to said received progress message, to each station member in said multicast group based on said comparing.

11. A non-transitory computer readable medium having stored thereon, a computer program having at least one code section for communicating information via a communications system, the at least one code section being executable by a computer for causing the computer to perform steps comprising:
    storing within a multicast switching device, data received from a data source located in a multicast group;
    multicasting said received data to a plurality of data destinations in said multicast group;
    releasing, responsive to said multicasting, at least a portion of data storage resources allocated to said storing said received data within said multicast switching device prior to receiving an acknowledgement of receiving the data from each of said plurality of data destinations; and
    in response to receiving said acknowledgement from each of said plurality of data destinations, sending an acknowledgement to said data source.

12. The non-transitory computer readable medium according to claim 11, wherein said received data comprises an incoming local sequence number.

13. The non-transitory computer readable medium according to claim 12, wherein said at least one code section comprises code for translating said incoming local sequence number to a global sequence number.

14. The non-transitory computer readable medium according to claim 13, wherein said at least one code section comprises code for determining an offset differential corresponding to each one of said plurality of data destinations.

15. The non-transitory computer readable medium according to claim 14, wherein said at least one code section comprises code for computing an outgoing local sequence number for said each one of said plurality of data destinations based on said corresponding offset differential.

16. The non-transitory computer readable medium according to claim 15, wherein said multicasting said received data comprises said computed outgoing local sequence number corresponding to said each one of said plurality of data destinations.

17. The non-transitory computer readable medium according to claim 11, wherein said at least one code section comprises code for receiving a progress message from a station member in said multicast group, wherein said progress message comprises a stage number indication.

18. The non-transitory computer readable medium according to claim 17, wherein said at least one code section comprises code for comparing a value associated with said stage number indication to values associated with stored information.

19. The non-transitory computer readable medium according to claim 18, wherein said at least one code section comprises code for sending an acknowledgement message, in response to said received progress message, to said station member based on said comparing.

20. The non-transitory computer readable medium according to claim 18, wherein said at least one code section comprises code for sending a progress update message, in response to said received progress message, to each station member in said multicast group based on said comparing.

21. A system for transporting information via a communications system, the system comprising:
    a hub node that is operable to store data received from a data source located in a multicast group;
    said hub node is operable to multicast said received data to a plurality of data destinations in said multicast group;
    said hub node is operable to release, responsive to said multicast, at least a portion of data storage resources allocated to said storing said received data within said hub node prior to receiving an acknowledgement from each of said plurality of data destinations; and
    said hub node is operable to, in response to reception of said acknowledgement of receiving the data from each of said plurality of data destinations, send an acknowledgement to said data source.

22. The system according to claim 21, wherein said received data comprises an incoming local sequence number.

23. The system according to claim 22, wherein said hub node is operable to translate said incoming local sequence number to a global sequence number.

24. The system according to claim 23, wherein said hub node is operable to determine an offset differential corresponding to each one of said plurality of data destinations.

25. The system according to claim 24, wherein said hub node is operable to compute an outgoing local sequence number for said each one of said plurality of data destinations based on said corresponding offset differential.

26. The system according to claim 25, wherein said multicasting said received data comprises said computed outgoing local sequence number corresponding to said each one of said plurality of data destinations.

27. The system according to claim 21, wherein said hub node is operable to receive a progress message from a station member in said multicast group, wherein said progress message comprises a stage number indication.

28. The system according to claim 27, wherein said hub node is operable to compare a value associated with said stage number indication to values associated with stored information.

29. The system according to claim 28, wherein said hub node is operable to send an acknowledgement message, in response to said received progress message, to said station member based on said comparison.

30. The system according to claim 28, wherein said hub node is operable to send a progress update message, in response to said received progress message, to each station member in said multicast group based on said comparison.

* * * * *